United States Patent [19]
Lisfeld et al.

[11] 4,090,069
[45] May 16, 1978

[54] SEMI-AUTOMATIC COARSE-FINE FOCUSING APPARATUS FOR MICROSCOPES

[75] Inventors: Robert Lisfeld, Ulmtal, Ulm; Werner Nickel, Sinn, Dillkreis; Güenter Reinheimer, Biebertal, all of Germany

[73] Assignee: Ernst Leitz Wetzlar GmbH., Wetzlar, Germany

[21] Appl. No.: 807,143

[22] Filed: Jun. 16, 1977

[30] Foreign Application Priority Data

Jun. 18, 1976 Germany ............................. 2627486

[51] Int. Cl.² .............................................. G01J 1/20
[52] U.S. Cl. ...................................... 250/201; 350/84; 353/101; 74/625; 74/110
[58] Field of Search ...................... 350/84, 82, 86, 255, 350/187, 40, 41, 46; 250/201, 205; 356/125; 353/101

[56] References Cited
U.S. PATENT DOCUMENTS

| 3,134,298 | 5/1964 | Volkholz | 353/101 |
| 3,135,817 | 6/1964 | Wrigglesworth et al. | 350/84 |

Primary Examiner—Rudolph V. Rolinec
Assistant Examiner—Michael J. Tokar
Attorney, Agent, or Firm—Richard L. Schwaab

[57] ABSTRACT

A semi-automatic coarse-fine focusing apparatus for microscopes adjusts the focus of a microscope through rotation of a shaft which rotates a pinion that drives a rack to reciprocate. The rack carries a specimen being observed by the microscope. The shaft which rotates the pinion is in turn driven by a gear that is meshed with a helix formed on a cylinder by a helical thread disposed therearound. The helix is non-rotatably mounted on another shaft that includes a knob which is manually turned to turn the helix and thus rotate the gear for coarse adjustment. The helix is preferably rigidly mounted on the shaft and the shaft is slidable. One arm of a bell crank engages an end face of the helix to reciprocate the helix and thus rotate the gear for fine adjustment. The other arm of the bell crank is engaged by a cam which pivots the bell crank according to the position of the cam. The position of the cam is determined by an electric motor which is preferably controlled by signals that vary with image contrast. Other signals may be generated by a shutter which has apertures which correspond to various positions of the cam.

9 Claims, 1 Drawing Figure

U.S. Patent    May 16, 1978    4,090,069
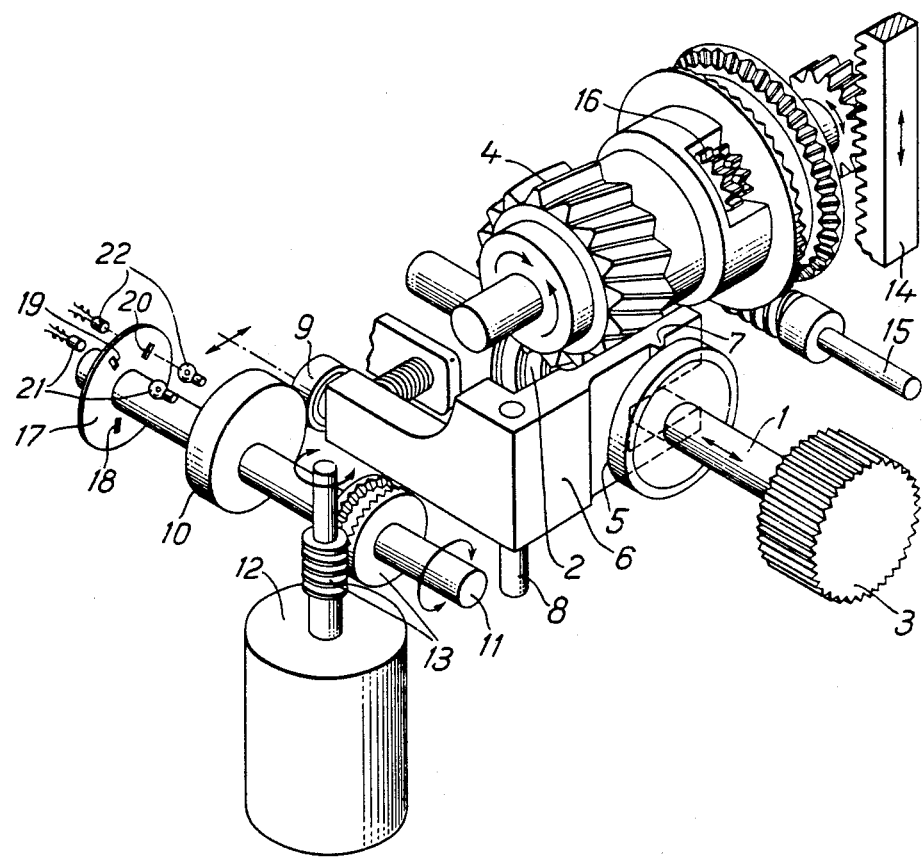

SEMI-AUTOMATIC COARSE-FINE FOCUSING APPARATUS FOR MICROSCOPES

BACKGROUND OF THE INVENTION

This invention relates to a coarse-fine focusing gear for microscopes with automatic focusing by means of a motor drive acting on the focusing gear which is preferably controlled by signals that vary with image contrast.

An adjustment mechanism with single-knob control for coarse-fine focusing adjustment is disclosed in Leitz publication "Schul- und Kursmikroskop HM," list 512 -63a. The axle of the mechanism is permanently connected to the control knob, a worm screw or helix is rotatably mounted on the axle and allowance is made for sliding of the worm screw in an axial direction. The worm screw is rotated by engagement between follower pins inserted on the axle and on one face of the worm screw. As long as the follower pins are not in meshing engagement, a mechanism comprising an inclined plane and a sphere and coupled to the axle causes the worm screw to move in axial direction. The worm meshes with a worm gear pinion which causes the specimen to be adjusted via a rack-and-pinion gear. Both the rotation of the worm screw and its axial movement cause the worm gear to rotate. Due to the varying pitch ratios they cause in the former case, a coarse focusing adjustment and, in the latter case, a fine focusing adjustment. The fine focusing range is delimited by the stop of the follower pins.

An adjustment mechanism for coarse-fine motion is disclosed in the Leitz publication "Das Planetengetriebe des Orthoplan, Ein Praezisionsantrieb im Mikroskopbau," loose leaf to list 512 - 82b, wherein the fine focusing motion is employed over the whole adjustment range of the gear independently of the coarse focusing motion. The coarse-fine focusing gears are coupled via a common planetary gear and act on the same terminal gear wheel for vertical motion of the specimen stage or mount. Power is transferred by means of separate coaxial control knobs.

Automatic focusing by means of a motor drive controlled by signals that vary with image contrast is known from West German Petty Pat. No. 7,219, 226, wherein the adjustment device for raising and lowering the specimen stage or mount is illustrated schematically.

SUMMARY OF THE INVENTION

It is an object of the instant invention to provide new and improved semi-automatic focusing apparatus for microscopes.

It is a principal object of the invention to provide an adjustment device for automatic focusing which is employed over a specified range of adjustment, does not restrict the operation of the manual coarse-fine focusing mechanism and, in particular, does not interfere with an unrestricted manual fine focusing adjustment feature.

In view of the foregoing objects and other objects in the instant invention contemplates a coarse-fine focusing apparatus for a microscope wherein the apparatus adjusts the focus of the microscope to rotation of a shaft. The shaft is driven by a gear which is in turn registered with a helically threaded cylinder. The helically threaded cylinder turns the gear either by rotation of the cylinder or by reciprocation of the cylinder. Means are provided for rotating the cylinder to provide for coarse adjustment of focus and means are provided for reciprocating the cylinder to provide for fine adjustment of focus. Furthermore, means are provided to generate control signals which control a motor which in turn drives means for reciprocating the cylinder.

The instant invention further contemplates utilizing a lever as the reciprocating means and mounting the helically threaded cylinder on a shaft whereby the cylinder may reciprocate relative to the shaft but cannot rotate relative to the shaft.

BRIEF DESCRIPTION OF THE DRAWING

The FIGURE is a persepctive view of a preferred embodiment of a coarse-fine focusing gear for microscopes which includes automatic adjustment of focusing.

DESCRIPTION OF THE PREFERRED EMBODIMENT

In accordance with the principles of the invention, a coarse-fine focusing gear of the type mentioned in the BACKGROUND OF THE INVENTION is provided, which focuses by provision of a worm screw or helix connected rigidly to a coarse focusing knob in the direction of rotation, but mounted with allowance for sliding movement relative to the axis of the knob and a motor-controlled sliding device frictionally connected to one face of the worm screw or helix.

The worm screw may be mounted on the coarse focusing axle by means of a longitudinal groove, allowance being made for sliding in axial direction, or it may be coupled rigidly thereto, the axle being adjustable in the longitudinal direction. An eccentric mounted on an axle of rotation may be provided as a sliding device, it being convenient to connect a lever to transmit motion from the eccentric and the face of the worm screw. It is further advisable to rigidly connect an abutment or stop on the coarse focusing axel near the face of the worm, with the lever having a bifurcated portion disposed in the space intermediate the face of the worm screw and the abutment face, frictionally connecting the lever to both surfaces.

A signal generator for indicating the intermediate position as well as for indicating the minimum and maximum positions may be coupled to the sliding device. It is preferred to couple the signal generator to the axle of rotation of the eccentric. The signal generator may be constructed of cams arranged on the axle of rotation and at least one switch associated with the cams. However, it may also be formed by diaphragms coupled to the axle of rotation which forms at least one light barrier, or shutter, so as to control the sliding device photoelectrically.

One or more switches may be coupled to the signal transmitter for switching the automatic focusing mechanism on and/or off. A control unit may likewise be provided to allow the sliding device to return automatically from the minimum or maximum position, as the case may be, to the intermediate position. It is also convenient to assign a display device to the signal generator.

The coarse-fine focusing gear shown herein corresponds to the planetary gear referred to in the introduction. The manual mode of operation remains unchanged, so that no detailed description of the prior art gear is required.

Referring now to the drawing, a cylinder with a helical thread therearound forming a worm screw or helix 2 is mounted on a coarse focusing axle 1, allowance being made for sliding in longitudinal direction. In the preferred embodiment, the helix 2 is rigidly connected to the coarse focusing axle 1 and the axle support is adjustable in longitudinal direction. The connection between the helix and axel may be by a key-and-slot arrangement, the key being on the axel and slot in the helix. Thus, rotation of a coarse focusing knob 3 is immediately transmitted to gear 4 via helix 2, so that actuation of coarse focusing mechanism is not influenced by the technique proposed by the invention.

An abutment face 5 is rigidly connected to the coarse focusing axle near one end of the helix 2. A bell crank lever 6 is disposed between the space intermediate the end of helix 2 and the abutment face 5, causing the coarse focusing axle 1 to be received within a bifurcated end portion of the bell crank. The bell crank lever 6 bears flatly against the end face of the helix 2 and against abutment face 5 via knife edge 7. The bell crank lever 6 pivots about axle 8.

The second lever arm of bell crank lever 6 is in operative connection with eccentric 10 via a follower roller 9. Eccentric 10 is mounted on axle of rotation 11 and may be rotated by motor 12 via worm gear 13. As mentioned earlier, motor 12 is controlled, for example, by signals that vary with image contrast.

The bell crank lever 6 is rotated about its axis 8 when eccentric 10 is rotated. Since the lever arm engaging the eccentric 10 is frictionally connected to or abuts helix 2, the particular path of travel of the periphery of the eccentric is transformed into a sliding motion of helix 2 in accordance with the ratio of the lengths of the two lever arms of the bell crank lever 6. However, axial motion of helix 2 causes gear 4 to rotate. Rotation of the gear 4 is transmitted via the same gear train as the coarse focusing motion to a rack 14 coupled to the specimen stage. The pitch of the thread of helix 2 employed with the axial movement is very small, consequently, the motor-controlled motion is a fine focusing motion. This fine focusing motion is independent of the manual fine focusing motion accomplished by rotating shaft 15 to drive planetary gear 16.

The speed of the automatic motor-controlled fine focusing motion may be varied by means of motor 12 and gear 13 and adapted to the particular working conditions. The range of adjustment is obtained by means of the particular throw or eccentricity of the eccentric and the chosen leverage of the bell crank lever 6.

There is arranged on axle of rotation 11 supporting the eccentric 10, a wheel diaphragm 17 having three diaphragm apertures 18, 19 and 20 which are individually assigned to the minimum, the intermediate and the maximum throw positions of eccentric 10. The diaphragm serves as a shutter for a light barrier setup 21, 22 consisting of photoreceptors and light sources in these positions of the eccentric. The light barrier setup 21 and 22 operates an electrical display and/or switching signal. It goes without saying that the same signals may be derived from the linear travel of the bell crank lever 6.

In operating the coarse-fine focusing gear, it is advantageous upon initiation of microscopic focusing, that the motor-driven slow-motion drive is set up to move to its intermediate position, which may be freely chosen from the whole range of adjustment of the specimen stage. Thereafter the manual coarse-fine focusing adjustment can be carried out, taking account of the visual observation of the microscopic image, while the intermediate position of the motor-driven slow-motion drive remains unchanged. The automatic focusing control, which continually moves the specimen plane to the plane of maximum image contrast during the microscopic observation, is then switched on thus providing a semi-automatic focusing apparatus for microscopes.

When the limit of the motor-driven fine focusing adjustment (maximum or minimum throw of eccentric 10, as the case may be) is reached, the automatic focusing control is switched off automatically; this is conveniently displayed by an indicator lamp. The motor-driven slow-motion drive again moves automatically to its intermediate position. After further manual focusing, the whole of the control range of the motor-driven fine focusing adjustment which is symmetrical with respect to the intermediate position is again available.

We claim:

1. A coarse-fine focusing apparatus for a microscope whereby the apparatus adjusts the focus of the microscope through rotation of a shaft, comprising:
    a gear for driving said shaft;
    a helix meshed with said gear for turning said gear; said helix rigidly connected to a cylinder having an axis for rotating said cylinder about said axis and for reciprocating said cylinder along said axis, whereby the helix rotates the gear both as the cylinder rotates and as the cylinder reciprocates;
    means for rotating the helix to provide for coarse adjustment of focus;
    means for reciprocating the helix independently of rotating the helix to provide for fine adjustment of focus;
    means for generating control signals; and
    motor means, controlled by said control signals, for driving said reciprocating means.

2. The coarse-fine focusing apparatus of claim 1 wherein the means for reciprocating the helix is a lever which abuts one side of the cylinder.

3. The coarse-fine focusing apparatus of claim 2 wherein the means for mounting the helix is a shaft.

4. The coarse-fine focusing aparatus of claim 3 wherein the shaft includes means for blocking rotation of the helix relative to the shaft by registering with complementary means on the cylinder whereby said blocking means and complementary means permit reciprocating movement of said helix relative to said shaft.

5. The coarse-fine focusing apparatus of claim 4 wherein the blocking means includes at least one key on said shaft and the complementary means is a groove in said helix which receives the key on said shaft.

6. The coarse-fine focusing apparatus of claim 5 wherein an abutment means surrounds said shaft and wherein said lever has a portion disposed between said abutment means and said one side of said helix.

7. Th coarse-fine focusing apparatus of claim 2 further including an eccentric cam driven by said motor means and engaging said lever whereby said lever advances said helix in accordance with the profile of said eccentric cam.

8. The coarse-fine focusing apparatus of claim 7 wherein the means for generating said control signals includes a shutter means coaxially mounted with said eccentric cam and driven by said motor means to register apertures on said shutter means with photoreceptors and lamps positioned adjacent said shutter means whereby said photoreceptors generate said control signals according to whether an aperture is registered therewith.

9. The coarse-fine focusing apparatus of claim 8 wherein said apertures are located on said shutter means in positions corresponding to minimum, intermediate and maximum rises in the profile of said eccentric cam.

* * * * *